US008979331B2

(12) United States Patent
Lee et al.

(10) Patent No.: US 8,979,331 B2
(45) Date of Patent: Mar. 17, 2015

(54) REPLACEABLE LED STREET LAMP MODULE

(75) Inventors: Ke-Chin Lee, Zhongshan (CN); Hung-Chieh Chen, Zhongshan (CN)

(73) Assignee: Zhongshan Weiqiang Technology Co., Ltd., Zhongsham, Guangdong (CN)

(*) Notice: Subject to any disclaimer, the term of this patent is extended or adjusted under 35 U.S.C. 154(b) by 253 days.

(21) Appl. No.: 13/589,059

(22) Filed: Aug. 17, 2012

(65) Prior Publication Data

US 2013/0223063 A1 Aug. 29, 2013

(30) Foreign Application Priority Data

Feb. 27, 2012 (CN) .......................... 2012 1 0044411

(51) Int. Cl.

| | |
|---|---|
| ***B60Q 1/06*** | (2006.01) |
| ***F21V 29/00*** | (2006.01) |
| ***F21S 4/00*** | (2006.01) |
| ***F21V 21/00*** | (2006.01) |
| ***F28F 1/42*** | (2006.01) |
| ***F28F 1/30*** | (2006.01) |

(52) U.S. Cl.
USPC ...... 362/373; 362/249.02; 362/294; 165/179; 165/182

(58) Field of Classification Search
USPC ............. 362/249.02, 294, 373; 165/177, 179, 165/182, 185
See application file for complete search history.

(56) References Cited

U.S. PATENT DOCUMENTS

| | | | | |
|---|---|---|---|---|
| 7,494,248 | B2 * | 2/2009 | Li | 362/294 |
| 7,568,817 | B2 * | 8/2009 | Lee et al. | 362/294 |
| 7,699,501 | B2 * | 4/2010 | Liu | 362/294 |
| 7,748,876 | B2 * | 7/2010 | Zhang et al. | 362/373 |
| 8,092,054 | B2 * | 1/2012 | Liu et al. | 362/373 |

* cited by examiner

*Primary Examiner* — Robert May
*Assistant Examiner* — Alexander Garlen
(74) *Attorney, Agent, or Firm* — Jackson IPG PLLC

(57) ABSTRACT

The invention discloses a replaceable LED street lamp module, including at least one module portion and a clamping sheet set. The module portion includes an LED module, a lens, an inner radiator, an outer radiator and a heat pipe set, the inner radiator and the outer radiator are sleeved with each other, the heat pipe set is bent and located between the inner radiator and the outer radiator and supports and fixes the LED module, the lens protects the LED module and allows light to be emitted from the LED module, notches are arranged on the outer circle of the outer radiator, and the clamping sheet set is clamped in the notch via two clamping sheets in order to clamp and fix the module portion, thereby being assembled on the opening of the street lamp housing.

9 Claims, 9 Drawing Sheets

REPLACEABLE LED STREET LAMP MODULE

TECHNICAL FIELD OF THE INVENTION

The invention relates to a street lamp, in particular to a replaceable LED street lamp module.

BACKGROUND OF THE INVENTION

Street lamp, the essential road illumination equipment in people's daily life, has been widely used in streets and squares to lighten nearby area in dark night. Based on its wide and frequent use, the street lamp is required to afford sufficient illumination intensity and long service life. Most traditional street lamps are incandescent lamps and high voltage sodium lamps. However, LED, with advantages of high efficiency, energy saving, environmentally friendly and long service life, has become common use, and the trend of replacing the traditional street lamps with LED street lamps is ongoing. Yet, the amount of traditional street lamps is so large that to complete the replacement in a short time frame is hard to achieve. Besides, LED still has some problems with suitability and heat dissipation, so if most existing traditional street lamps are to be replaced by LED street lamps, there will be a great many structure components needing to be changed, thus increasing the replacement difficulty and wasting replaced street lamp housings and wires. Since LED produces relatively high heat energy, it is critical to ensure LED radiate heat energy effectively after the replacement. Moreover, if the replacement is to be carried out, LED street lamps are required to have intact integral structure, thus causing relatively high cost. It is thus clear that the problems aforementioned will hinder the popularization of LED street lamps, and necessary and targeted technical improvement shall be made during the popularization.

SUMMARY OF THE INVENTION

The technical problem to be solved in the invention is to provide a LED street lamp module, which can be used for replacing the internal subassemblies of the existing street lamps and can be matched with the present street lamp housings, which has sufficient radiation capability and which also can be replaced conveniently.

The invention employs the following technical solution to solve the technical problem:

a replaceable LED street lamp module, comprising at least one module portion and a clamping sheet set; and the module portion comprising:

an LED module, formed by encapsulating plural LED chips in an Aluminum Nitride (AlN) ceramic substrate;

a lens, serving as the secondary optics of an LED light source and protecting the LED module;

an inner radiator, mainly consisting of an inner cylinder and an outer cylinder that are concentric and are sleeved with each other, with plural fins being connected between the inner cylinder and the outer cylinder, and an airflow channel that can produce a chimney effect by the received heat energy being formed between the adjacent fins;

an outer radiator, having a through hole, with plural radiating fins being formed on the periphery of the through hole in the axial direction, the outer radiator being sleeved outside the inner radiator via the through hole, a circle of notches pitching into the radiating fins being arranged on the periphery of the plural radiating fins;

a heat pipe set, consisting of plural U-shaped bent heat pipes, wherein the U-shaped middle sections of the plural heat pipes are spliced to form a flat face in order to support and fix the LED module, the U-shaped ends of the plural heat pipes are sleeved outside the inner radiator and matched with the outer wall of the outer cylinder of the inner radiator and the inner wall of the through hole of the outer radiator; wherein the total radiation power of the heat pipe set is larger than or equal to the power to be radiated by the LED module.

The heat conduction path is that, LED directly transfers heat to the AlN ceramic substrate, then directly to heat pipes and then to the inner radiator and the outer radiator, heat energy is finally emitted by the fin device in the radiators in aid of air convection and radiation, wherein the AlN ceramic substrate and the heat pipes are heat conduction media with low thermal resistance. The clamping sheet set includes at least two clamping sheets, the inner edges of the at least two clamping sheets are clamped in the notches of the radiating fins, thereby clamping and fixing at least one module portion, and the outer edges of the at least two clamping sheets serve as fixing portions used for locking and fixing the street lamp housing;

As further improvement of the above solution, a support plate is arranged between the flat face of the heat pipe set and the inner radiator, patterns for placing the U-shaped middle sections of the heat pipes are arranged on the front face of the support plate, and the back face of the support plate closely fits the end of the inner radiator.

Further, plural first grooves are arranged on the outer wall of the outer cylinder of the inner radiator in the axial direction, the U-shaped ends of the heat pipe set are matched and closely attached in the first grooves, wherein the first grooves are arc-shaped, the side of the first heat pipe set fitted to the first grooves is an arc-shaped face correspondingly.

Further, plural second grooves are arranged on the wall face of the through hole of the outer radiator in the axial direction, the U-shaped ends of the heat pipe set are matched and closely attached in the second grooves, wherein the second grooves are arc-shaped, the side of the heat pipe set fitted to the second grooves is an arc-shaped face correspondingly.

As improvement of the above solution, fins are arranged on the inner radiator as closer as possible to the plural first grooves.

As improvement of the above solution, radiating fins are arranged on the outer radiator as closer as possible to the plural second grooves.

As improvement of the above solution, the outer sides of the radiating fins of the outer radiator are in turn connected by a connecting fin to form plural outer airflow channels that can produce a chimney effect by the received heat energy.

As improvement of the above solution, the lens is fixed on the support plate or inner radiator or outer radiator.

Further, mounting holes are arranged at the outer edged of the clamping sheets, and the mounting holes can be locked by screws by coordinating with mounting holes at the lower part of the housing.

The invention has the following beneficial effects: with employment of an LED light source, the invention is more energy-saving and environmentally friendly; the invention is dedicatedly used to fit universal street lamp housings in the market, so that the traditionally internal light source subassemblies can be completely replaced without large change to the traditional street lamps, a lot of inconvenience is avoided, the cost of both product and manpower can be saved effectively, and the popularization and promotion of LED illumination are facilitated; in the invention, as the clamping sheet set is fixed with the housing, both mounting and dismounting are flexible, and convenient replacement can be realized; furthermore, compared with traditional street lamps which radiate heat by the housing, the inner radiator, outer radiator and coordinated heat pipe set equipped in the LED street lamp module can realize better radiation, so that the working stability and service life of the LED module can be guaranteed, and, as the module is located below the housing when in use, the accumulation of dust can be avoided, so that the radiation capability of the module is not easy to be influenced.

BRIEF DESCRIPTION OF THE DRAWINGS

To describe the technical solution in the embodiments of the invention more clearly, drawings to be used in the description of the embodiments will be described below briefly. Obviously, the described drawings are only parts of the embodiments of the invention, not all embodiments. For persons skilled in the field, the invention may have other design solutions and drawings according to these drawings without any creative efforts.

DETAILED DESCRIPTION OF THE PREFERRED EMBODIMENTS

The concepts, the specific structures and the produced technical effects of the invention will be described below clearly and completely with reference to embodiments and drawings, in order to fully understand the purposes, features and effects of the invention. Obviously, the described embodiments are only parts of the embodiments of the invention, not all embodiments. Based on the embodiments of the invention, any other embodiments obtained by persons skilled in the field without any creative efforts should be included in the protection scope of the invention.

Figure 1:
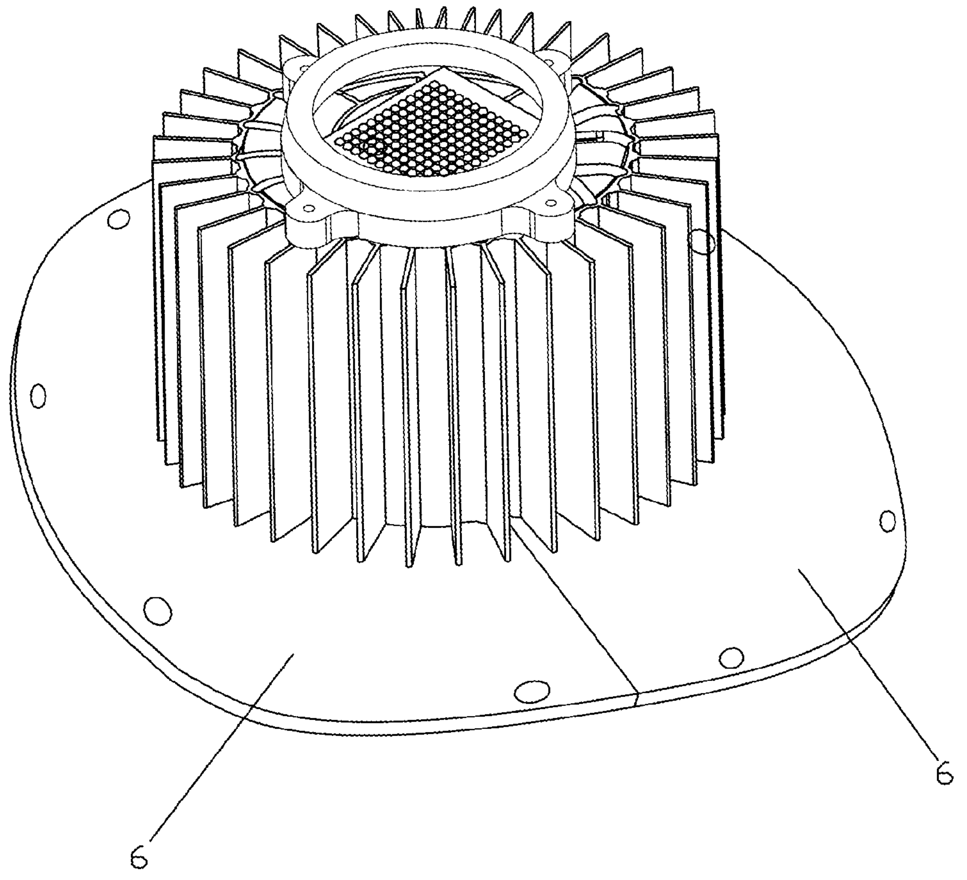
FIG. 1 is a stereo structure diagram of the invention.

With reference to FIG. 1, a replaceable LED street lamp module provided in the invention mainly consists of two parts: a module portion and a clamping sheet set.

Figure 2:
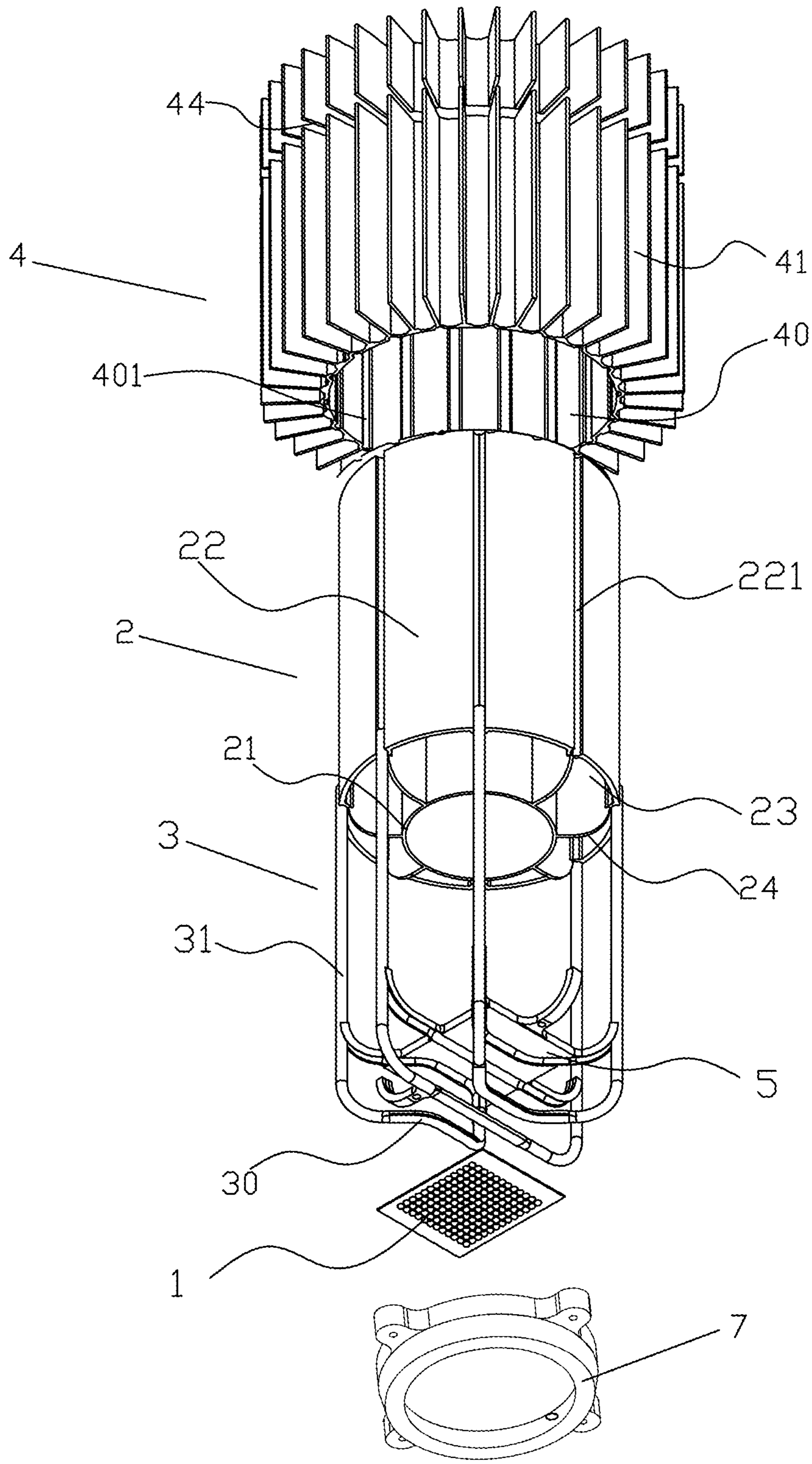
FIG. 2 is a split structure diagram of a module portion in the invention.

Wherein, as shown in FIG. 2, the module portion includes: an LED module 1, an inner radiator 2, a heat pipe set 3, an outer radiator 4 and a lens 7. The LED module 1 may be formed by integrally arranging a plurality of arrayed LEDs in an AlN ceramic substrate, the power thereof can be adjusted according to the requirement on the brightness of the street lamp to be replaced. The AlN ceramic substrate is used for fixed mounting, it can conduct heat energy produced when the LED works out, and besides, it also can be used as the electricity connecting structure of the LED module 1. The lens 7 serves as the secondary optics of the LED light source and protects the LED module 1.

Figure 3:
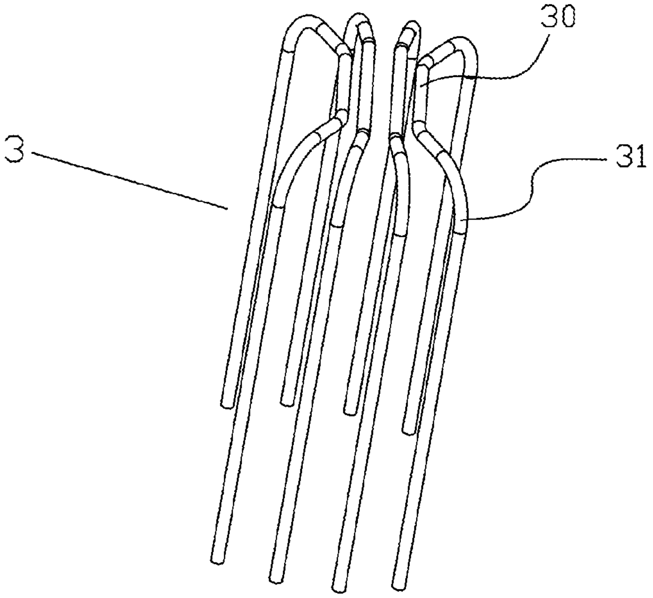
FIG. 3 is a structure diagram of a heat pipe set in the invention.
Figure 4:
FIG. 4 is a sectional structure diagram of a heat pipe in the invention.
Figure 5:
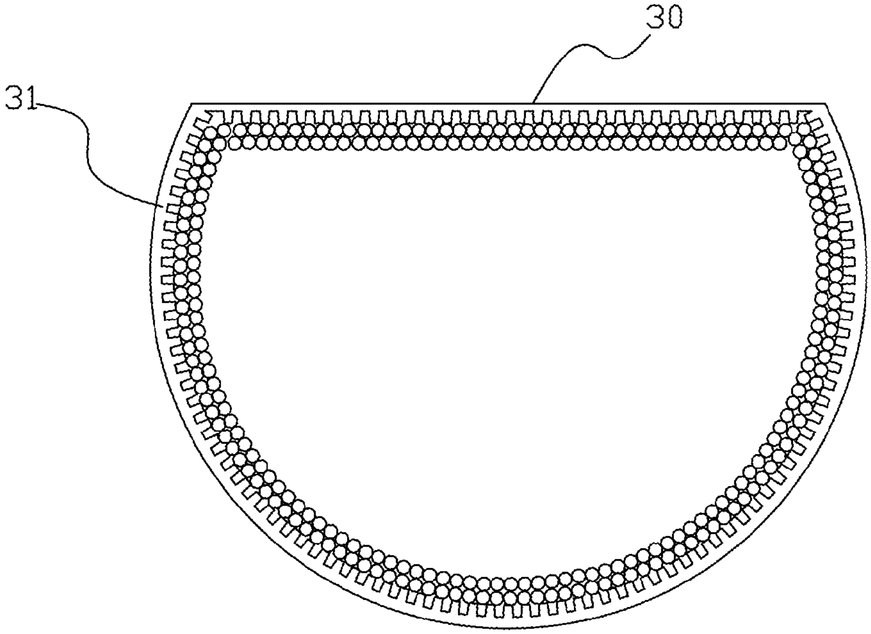
FIG. 5 is a sectional structure diagram of the flat face position of a heat pipe in the invention.

As a heat conduction component, the function of the heat pipe set 3 is to conduct heat energy transferred from the LED module 1 out quickly and effectively, with reference to FIG. 3, the heat pipe set 3 consist of plural heat pipes 31, and as shown in FIG. 4, the heat pipes 31 are elements having an internal structure of grooves that are copper powder sintered in combination with capillary sintered, the number of grooves is greater than 120, the particle of copper powder is larger than the width of grooves, in company with the working solution, the heat resistance of heat pipes is kept to be less than 0.05° C./watt so as to realize quick heat conduction; each heat pipe 31 is bent to three parts in a U shape, that is, the middle part is a U-shaped middle section and U-shaped ends are distributed on two sides of the U-shaped middle section, the U-shaped ends of a plurality of heat pipes 31 are spliced or welded together to form a flat face 30, the flat face 30 supports the LED module 1, after the flat face 30 is pressed out, the sectional structure of the flat face 30 of heat pipes may refer to FIG. 5. For a plurality of heat pipes 31 spliced or welded together, the U-shaped ends thereof are located on one side of the flat face 30 and distributed in the peripheral direction with respect to the flat face 30, to form an annular fence structure like a round fence in terms of overall shape, a space that is right enough to sleeve the inner radiator 2 in the space is reserved between the annular fence sheaths, in order to sleeve the inner radiator 2 into the space; besides, the periphery of the annular fence structure formed by the U-shaped ends of heat pipes 31 is combined and located by the groove 401 of the outer radiator 4. Wherein, the inner side of the U-shaped ends of heat pipes 31 fits the groove 221 on the outer wall of the inner radiator 2, and the outer side thereof fits the inner wall of the through hole 40 of the outer radiator 4. In this way, heat energy received by the flat face 30 from the LED module 1 is one-dimensionally linearly radiated to the annular fence formed by the U-shaped ends according to the heat conduction property of heat pipes, and then transferred to the inner radiator 2 and the outer radiator 4, and finally radiated out by the inner radiator 2 and the outer radiator 4.

Figure 6:
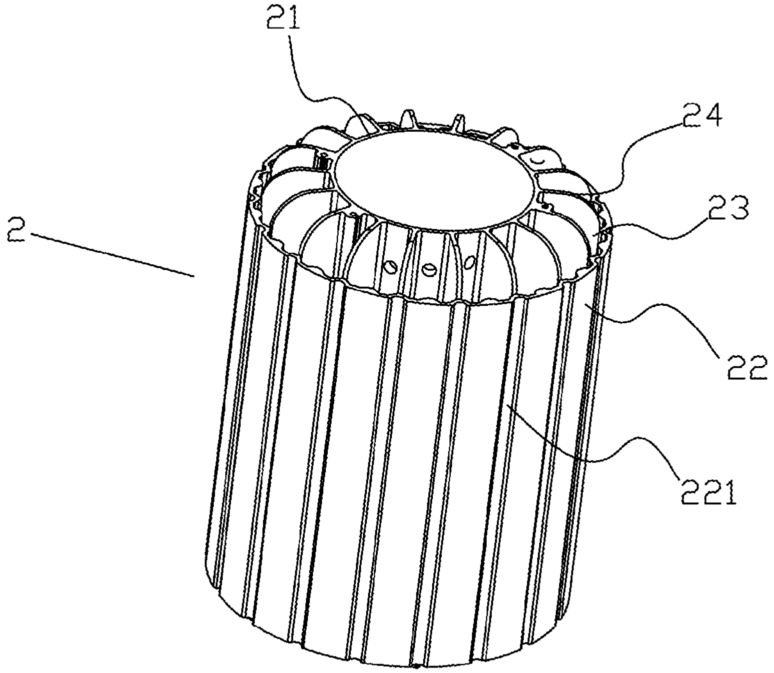
FIG. 6 is a structure diagram of an inner radiator in the invention.

With reference to FIG. 6, the inner radiator 2 mainly consists of an inner cylinder 21 and an outer cylinder 22 that are concentric and are sleeved with each other, the inner cylinder 21 and the outer cylinder 22 may be round cylinders or polygonal cylinders, plural fins 24 are connected between the inner cylinder 21 and the outer cylinder 22, so that spaces are isolated to form a plurality of airflow channels 23, these airflow channels 23 can produce a chimney effect under the reception of heat energy to facilitate air to flow.

After the foregoing heat pipe set 3 is assembled with the inner radiator 2, the flat face 30 formed by the heat pipe set 3 is located right at one end of the inner radiator 2, and the flat face 30 and the LED module 1 supported by the flat face 30 are ensured not to block the airflow channels 23 of the inner radiator 2 as much as possible. In this way, an excellent radiation path is formed in the inner radiator 2 via the inner cylinder 21, the outer cylinder 22, the airflow channels 23 and the fins 24, when the LED module 1 works to produce heat energy, heat energy is transferred to the flat face 30 and the U-shaped ends from the heat pipe set 3, then transferred to the outer wall of the outer cylinder 22 and the end of the fins 24, and then radiated to the entirety of the inner radiator 2 via the outer cylinder 22 and the fins 24, and finally quickly radiated out via the chimney effect produced by the channels 21. besides, the space between annular fences formed by the heat pipes 31 can be guaranteed to be as even as possible, simultaneously, channels 21 of the inner radiator 2 are guaranteed to be distributed evenly, so as to realize the rational distribution and radiation of heat energy.

In the finally assembled structure of the module portion, the lens 7 needs to be located outside completely in order to protect the LED module 1 and ensure that light from the LED module 1 can be emitted from the lens 7, in this way, waterproof and dust-proof protection effects to the LED module 1 can be achieved while illumination is met, the lens 7 may be selectively locked on the AlN ceramic substrate, the support plate 5 or inner radiator 2 or outer radiator 4.

Various fittings of the street lamp structure, for example, power module, can be arranged in the middle hole of the cylindrical inner radiator 2 for hidden mounting, while leads are educed from the end of the hole to be connected onto the pin of the LED module 1.

Figure 7:
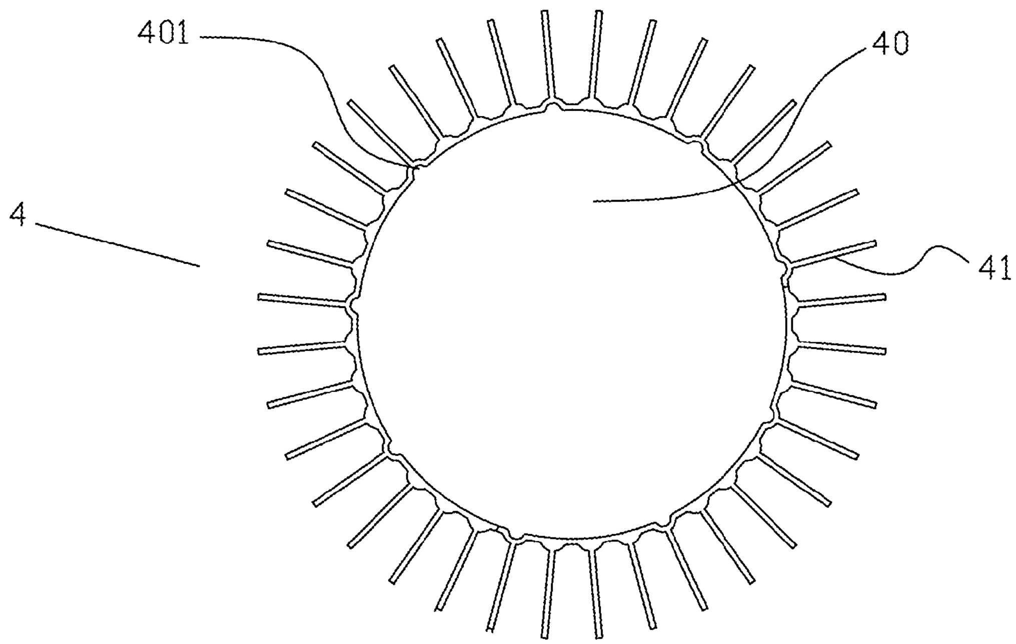
FIG. 7 is a structure diagram of an outer radiator in the invention.
Figure 8:
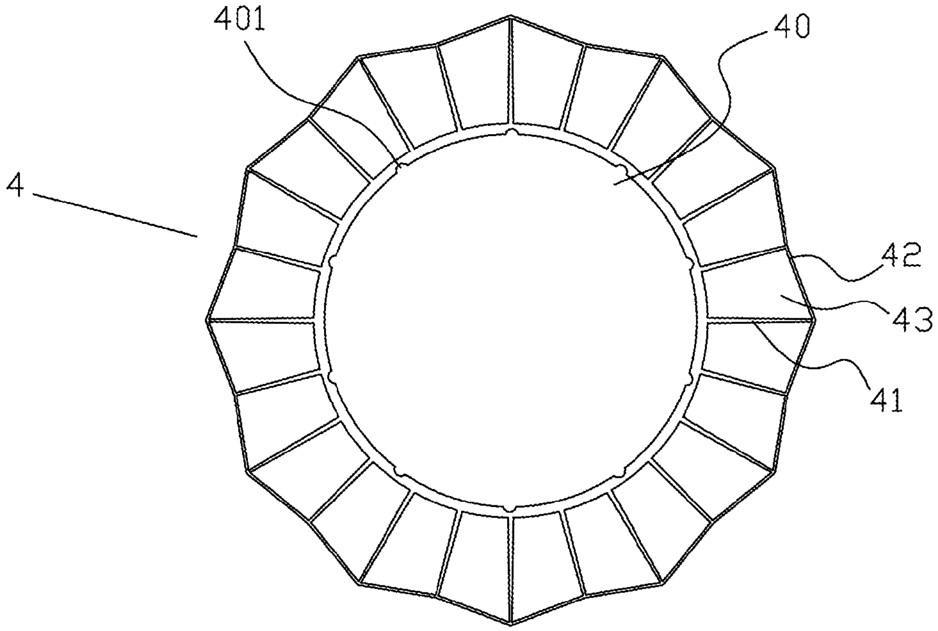
FIG. 8 is a structure diagram of another embodiment of the outer radiator in the invention.

With reference to FIG. 7, the outer radiator 4 is provided with a through hole 40, a radiation structure is arranged on the periphery of the through hole 40 in the axial direction, the outer radiator 4 is sleeved outside the inner radiator 2 via the through hole 40, so that the U-shaped ends of the heat pipe set 3 are located between the through hole 40 and the outer cylinder 22 of the inner radiator 2. In this way, heat energy transferred by the U-shaped ends of the heat pipes 3 is transferred to the outer radiator 4 via the inner wall of the through hole 40 to be radiated out by the outer radiator 4 besides transferred to the inner radiator 2 via the outer wall of the outer cylinder 22. To achieve enough radiation effect, in the invention, plural radial radiating fins 41 are formed on the periphery of the through hole 40 of the outer radiator 4 in the axial direction, radiation is realized via the contact of these radiating fins 41 and air; the radiating fins 41 may be in a single-wing structure and also may be in a Y or T shape, the larger the surface area thereof, the much the contact with outside air, therefore the better the radiation capability. Besides, in an optional solution as shown in FIG. 8, the outer sides of the plurality of radiating fins 41 are in turn connected by a connecting fin 42, in this way, one axially communicated outer airflow channel 43 is formed between adjacent radiating fins 41, these outer airflow channels 43 also can produce a chimney effect via the transferred heat energy, further to achieve better radiation effect.

Figure 9:
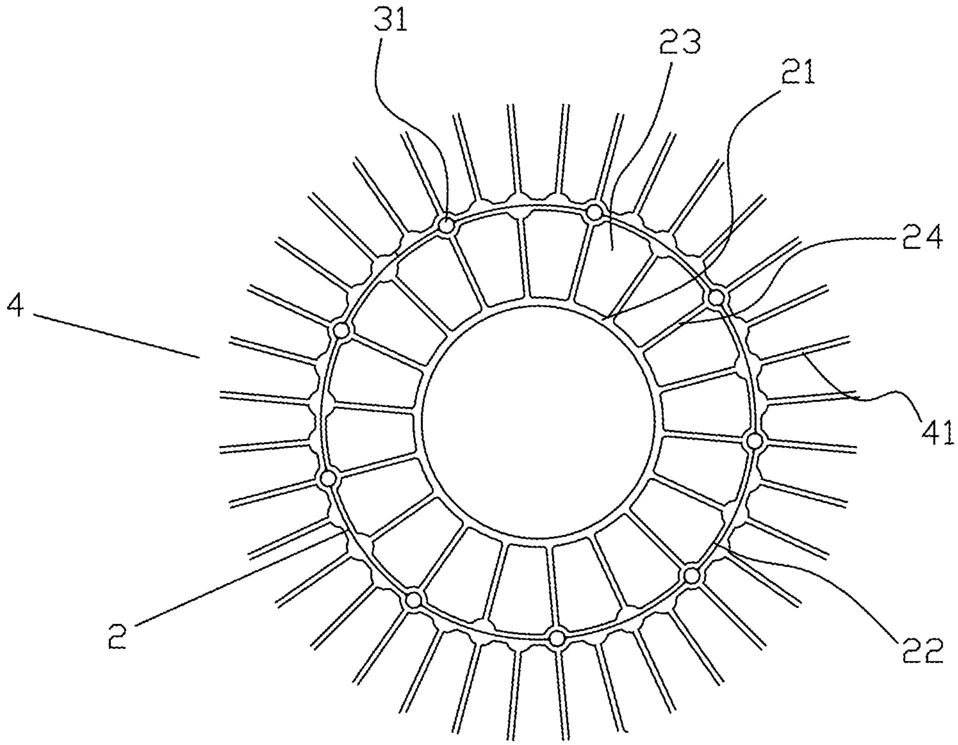
FIG. 9 is an assembly state diagram of the heat pipe set, inner radiator and outer radiator in the invention.

As shown in FIG. 9, after the outer radiator 4 is assembled with the inner radiator 2 and the heat pipe set 3, another radiation path is formed, it can be expressed as follows: heat energy produced when the LED module 1 works is transferred to the flat face 30 and the U-shaped ends via the heat pipe set 3, then transferred to the inner wall of the through hole 40 of the outer radiator 4 via the U-shaped ends, then diffused to the whole outer radiator 4 via the through hole 40, and finally quickly radiated out via the radiating fins 41 of the outer radiator 4 or the outer airflow channels 43.

As heat pipes in the heat pipe set 3 are basically round, excessive deformation to such super heat conduction subassembly is not good for its excellent heat conduction efficiency, therefore, in one preferred implementation solution, plural first grooves 221 are arranged on the outer wall of the outer cylinder 22 of the inner radiator 2, the first grooves 221 are used for coordinating the U-shaped end of each heat pipe 31 in the heat pipe set 3, so that the U-shaped ends can be respectively matched with and closely mounted in the corresponding first grooves 221, wherein the first grooves 221 can be designed into an arc shape, and the side of the U-shaped ends of the heat pipe set 3 fitted to the first grooves 221 is an arc-shaped face correspondingly, i.e., original shape, in this way, the U-shaped ends of the heat pipes 31 can perfectly fit the outer wall of the outer cylinder 22 of the inner radiator 2 without being processed by pressing, so as to achieve the purpose of tight coordination, furthermore, the solution is also helpful to provide a contact area between the U-shaped ends of the heat pipe set 3 and the outer wall of the outer cylinder 22 as large as possible, in order to make the heat conduction efficiency better. Simultaneously, in the preferred solution, fins 24 are arranged on the inner radiator 2 as close as possible to the first grooves 221, to make distance from the heat pipes 31 fitted to the first grooves 221 to the fins 24 shortest, in order to transfer heat energy in the shortest distance, further to optimize the radiation efficiency. Of course, not all fins 24 have to be arranged at the position closest to the first grooves 221.

Similarly, plural second grooves 401 are arranged on the inner wall of the through hole 40 of the outer radiator 4, the second grooves 401 are used for coordinating the U-shaped end of each heat pipe 31 in the heat pipe set 3, so that the U-shaped ends can be respectively matched with and closely mounted in the second grooves 401, wherein the second grooves 401 can be designed into an arc shape, and the side of the U-shaped end of each heat pipe 31 in the heat pipe set 3 is an arc-shaped face correspondingly, i.e., original shape, in this way, the U-shaped ends of the heat pipes 31 can perfectly fit the inner wall of the through hole 40 of the outer radiator 4 without being processed by pressing, so as to achieve the purpose of tight coordination, similarly, the solution is also helpful to provide a contact area between the U-shaped ends of the heat pipe set 3 and the inner wall of the through hole 40 of the outer radiator 4 in order to make the heat conduction efficiency better. Simultaneously, in the preferred solution, radiating fins 41 are arranged on the outer radiator 4 as close as possible to the second grooves 401, to make distance from the heat pipes 31 fitted to the second grooves 401 to the radiating fins 41 shortest, in order to transfer heat energy in the shortest distance, further to optimize the radiation efficiency. Of course, not all radiating fins 41 have to be arranged at the position closest to the second grooves 401.

Besides, in order to fix the heat pipe set 3 well, in the preferred implementation solution of the invention, a support plate 5 is particularly provided to place and fix the flat face 30 of the heat pipe set 3, in the overall coordination structure, the support plate 5 can be located between the heat pipe set 3 and the end of the inner radiator 2, and can be fixed with the flat face 30 of the heat pipe set 3 or the end of the inner radiator 2 by means of welding or non-welding, besides, in order to match with the heat pipe set 3 better, various patterns 51 for placing the U-shaped middle sections of the heat pipes 31 are arranged on the front face of the support plate 5, simultaneously, the back face of the support plate 5 closely fits the end of the inner radiator 2.

Figure 10:
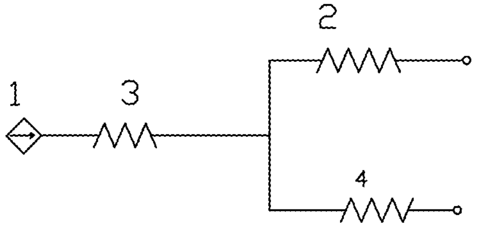
FIG. 10 is a diagram of a heat conduction path.
Figure 11:
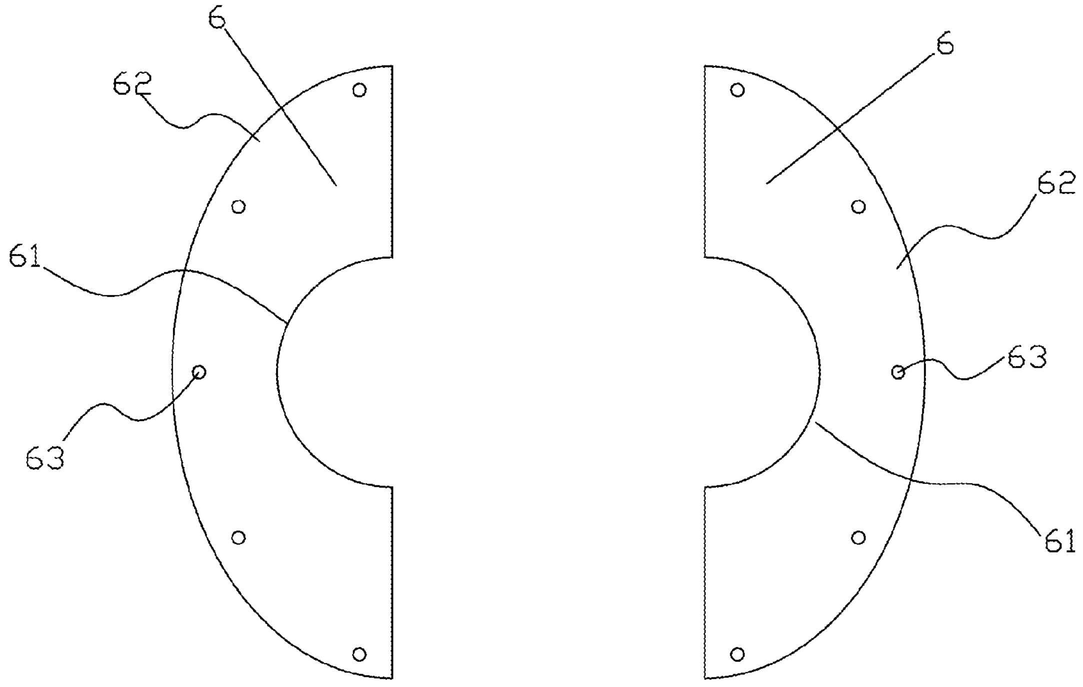
FIG. 11 is a structure diagram of a clamping sheet set in the invention.

It can be seen that, by the coordination of the inner radiator 2 and the outer radiator 4, the module portion provided in the invention receives heat energy that is produced by the LED module 1 and transferred from the heat pipe set 3 and simultaneously radiates heat, as shown in FIG. 10, the equivalent radiation path can be expressed as follows: heat energy produced by the LED module 1 is transferred to the heat pipe set 3, a small part of heat energy is transferred to the end of the inner radiator 2 via the support plate 5 in the U-shaped middle section of the heat pipe set 3, a large part of heat energy is respectively transferred to the inner radiator 2 and the outer radiator 4 via the U-shaped ends of the heat pipe set 3, and finally radiation is realized by the heat exchange of the inner radiator 2 and the outer radiator 4 with air; it can be seen that, the inner radiator 2 and the outer radiator 4 are equivalent to parallel radiation components, so that the radiation efficiency can be improved effectively. Of course, it should be noted that, the total radiation power of the heat pipe set 3 must be greater than or equal to the power to be emitted by the LED module 1, in this way, the accumulation of heat energy from the LED module 1 will not be caused, and heat energy can be transferred out timely.

The module portion in the invention needs to be used in company with the street lamp housing. Traditional street lamp housings have various shapes and sizes, but in the basic structure, all the housings have an opening from which light is emitted by the internal light source, in the invention, the module portion is assembled by utilizing the coordination of the opening structure and the clamping sheet set.

Figure 13:
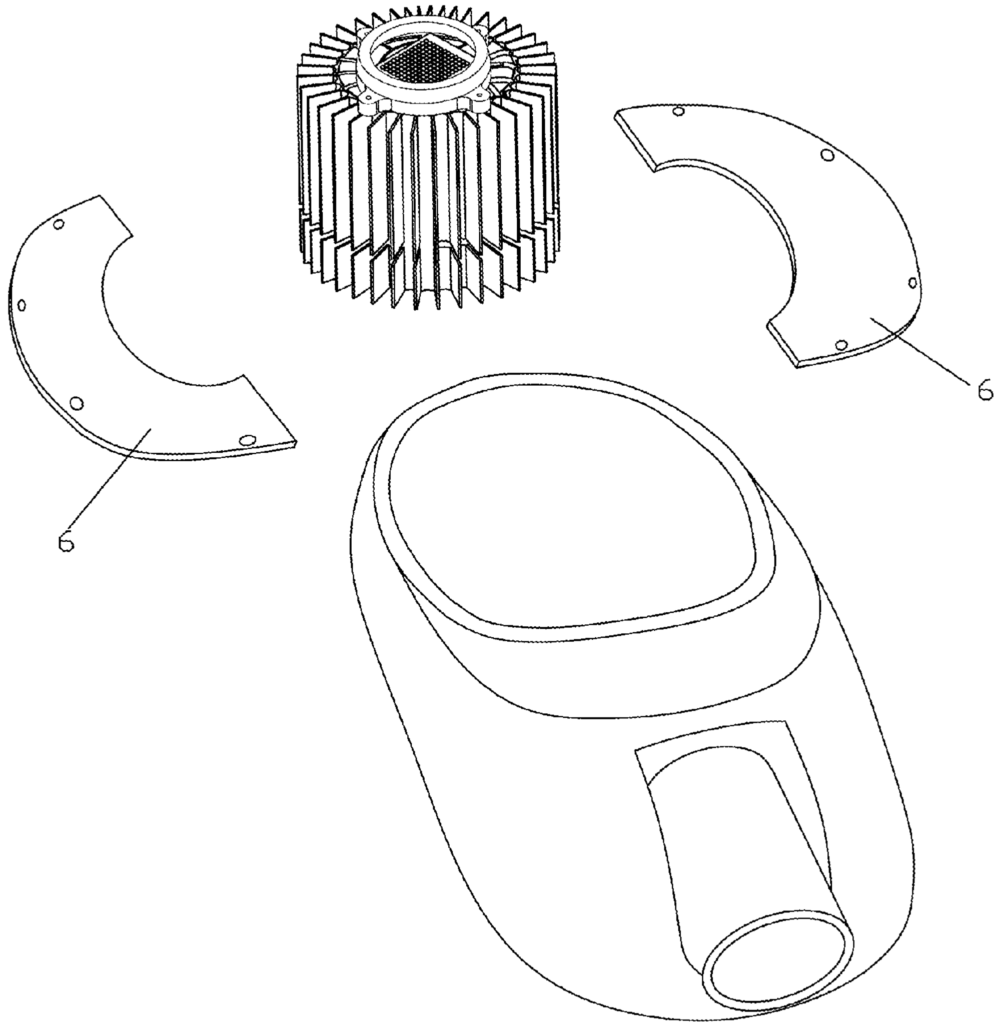
FIG. 13 is a split structure diagram of the coordination of the invention and the housing.

As shown in FIG. 1 and FIG. 2, to match with the clamping sheet set, a circle of a circle of notches 44 pitching into the radiating fins 41 are arranged on the periphery of the plural radiating fins 41 of the outer radiator 4; correspondingly, as shown in FIG. 1 and FIG. 13, the clamping sheet set mainly consists of at least two clamping sheets 6, the at least two clamping sheets 6 form a relatively complete enclosure structure in the outer ring, wherein the inner edges 61 of clamping sheets 5 are coordinated to clamp the notches 44 of the radiating fins 41, in this way, the at least two clamping sheets 5 form an outer clamping ring and clamp and fix the outer radiator 4 via the corresponding notches 44, relative to the outer radiator 4, other structures of the module portion such as the LED module 1, the inner radiator 2 and the heat pipe set 3 are supported and fixed in the outer radiator 4, therefore, as long as the clamping sheets 6 clamp and fix the outer radiator 4, it means that they support and fix the whole module portion, correspondingly, the outer edges 62 of the clamping sheets 6 can be used as fixing portions to be locked and fixed with the street lamp housing, in order to realize ideal locking and fixing; as shown, is a common embodiment, the outer edges 62 of the clamping sheets 6 are provided with mounting holes 63, the mounting holes 63 may serve as bolt fixing holes, in coordination with which relatively ideal locking and fixing can be realized via bolts at the edge of the opening of the street lamp housing. Besides, it should be noted that, in an embodiment in which the outer radiator 4 has outer airflow channels 43, a certain opening needs to be reserved after the inner edges 61 of the clamping sheets 5 are clamped into the notches of the outer radiator 4, to avoid blocking the outer airflow channels 43.

It can be seen that, the module portion is locked and fixed on the street lamp housing via the clamping sheet set, so that the module portion needs no change to its inside structure as an independent entirety no matter for mounting or dismounting, the operation is quite convenient and quick.

Figure 12:
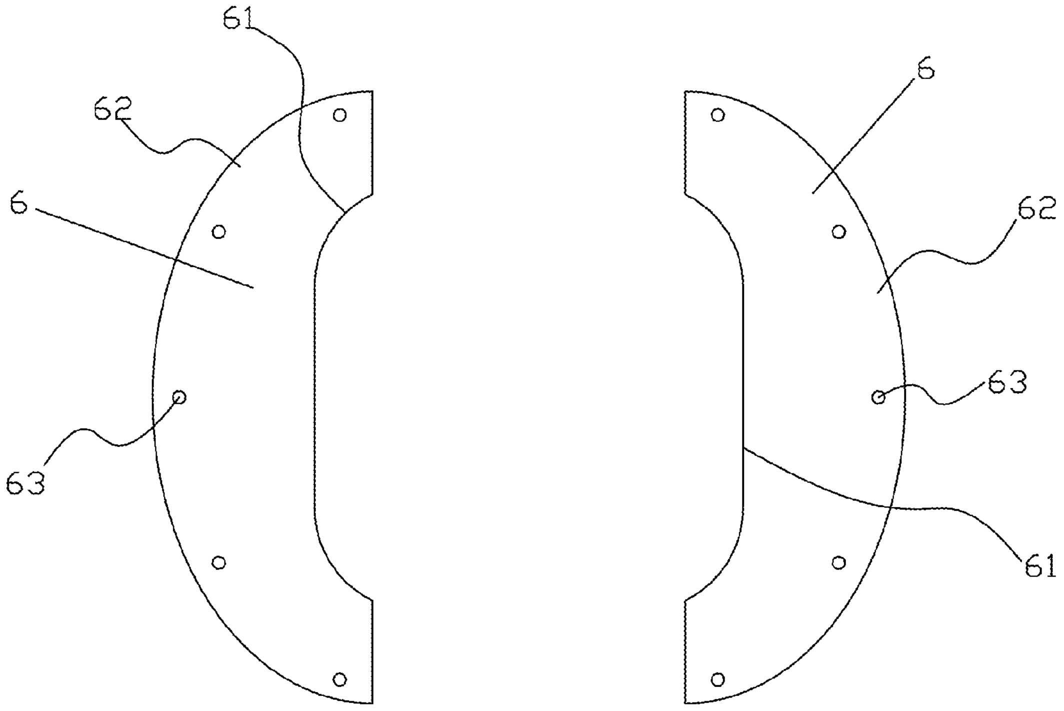
FIG. 12 is a structure diagram of another embodiment of the clamping sheet set in the invention.

For street lamps in different shapes and sizes, the change at the opening of the housing will not be significant; therefore, module portions in a same size can be used for realizing installation and replacement as long as clamping sheet sets in the corresponding type are designed, so that the module portions can be uniformed in model to bring convenience to mass production. Of course, for street lamps with high brightness requirement and large size, as the size of the opening of housings thereof is also relatively large, a plurality of module portions can be received, as shown in FIG. 12, a clamping sheet set that can support and fix a plurality of module portions can be correspondingly designed in the invention, to clamp and fix the plurality of module portion onto the opening of the housing, in order to achieve the wanted illumination effect.

Figure 14:
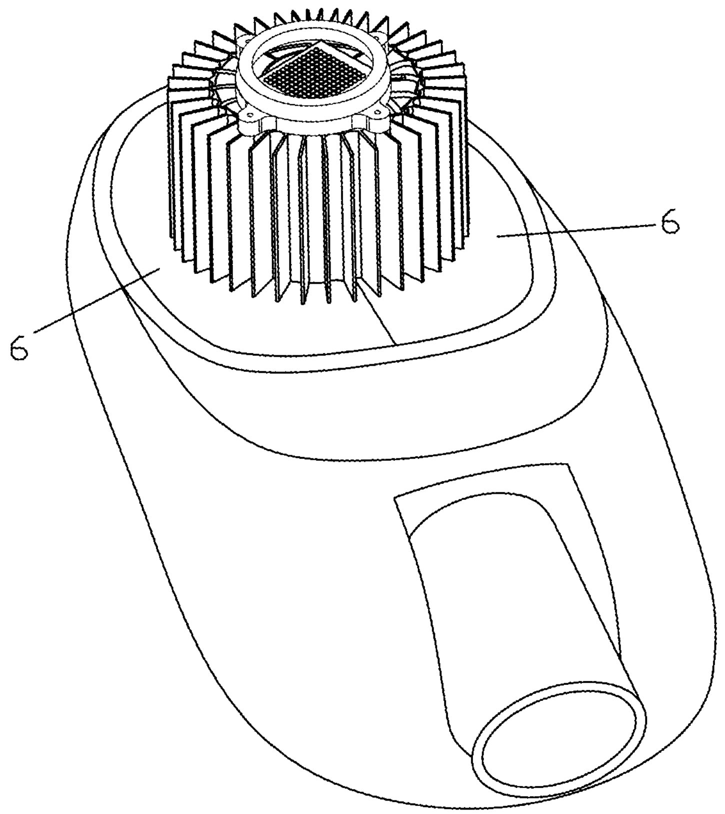
FIG. 14 is a structure diagram when the invention and the housing are assembled together.

The shape of the invention assembled on the housing after the module portion is clamped by the clamping sheet set may refer to FIG. 13 and FIG. 14, it can be seen from the drawings that, at the opening of the housing, the module portion can be clamped and fixed as long as a clamping sheet set in a proper shape is used, both mounting and dismounting are quite convenient.

Obviously, with employment of an LED light source, the module fits universal street lamp housings in the market while achieving effects of energy-saving and environmentally friendly, so that the traditionally internal light source subassemblies can be completely replaced without large change to the traditional street lamps, a lot of inconvenience is avoided, the cost of both product and manpower can be saved effectively, and the popularization and promotion of LED illumination are facilitated. Simultaneously, the structure of the module is convenient to mount/dismount and experience, and the invention is very flexible; besides, the inner radiator and the outer radiator are coordinated for heat radiation, so that the ideal heat radiation efficiency for LED is achieved, and also, as the module is located below the housing when in use, the accumulation of dust can be avoided, so that the radiation capability of the module is not easy to be influenced, and the module can be guaranteed to work in a long term.

Of course, the invention is not limited to the above implementation ways. For persons skilled in the field, the invention may have various equivalent deformations or replacements within the spirit of the invention, and these equivalent deformations or replacements should be included within the scope defined by the claims in the application.

What is claimed is:

1. A replaceable LED street lamp module, comprising at least one module portion and a clamping sheet set;

the module portion comprising:

an LED module, formed by encapsulating plural LED chips in an aluminum nitride ceramic substrate;

a lens, serving as the secondary optics of an LED light source and protecting the LED module;

an inner radiator, comprising an inner cylinder and an outer cylinder that are concentric and are sleeved with each other, a plurality of fins being connected between the inner cylinder and the outer cylinder, and an airflow channel formed between the adjacent fins that can produce a chimney effect by a received heat energy;

an outer radiator comprising a through hole, and a plurality of radiating fins being formed on the periphery of the through hole in an axial direction, the outer radiator being sleeved outside the inner radiator via the through hole, a circle of notches pitching into the radiating fins being arranged on the periphery of the plural radiating fins;

a heat pipe set, consisting of a plurality of U-shaped bent heat pipes, wherein U-shaped middle sections of the heat pipes are spliced to form a flat face in order to support and fix the LED module, U-shaped ends of the heat pipes are sleeved outside the inner radiator and fit between an outer wall of the outer cylinder of the inner radiator and an inner wall of the through hole of the outer radiator;

the clamping sheet set comprising at least two clamping sheets, wherein inner edges of the at least two clamping sheets are clamped in the notches of the radiating fins, thereby clamping and fixing at least one module portion, and outer edges of the at least two clamping sheets serve as fixing portions used for locking and fixing a street lamp housing;

wherein the total radiation power of the heat pipe set is larger than or equal to the power to be radiated by the LED module;

wherein the heat conduction path is as follows; the LED module directly transfers heat to the aluminum nitride ceramic substrate, then directly to the heat pipes, then to the inner radiator, and then lastly to the outer radiator, wherein the aluminum nitride ceramic substrate and the heat pipes are heat conduction media with low thermal resistance.

2. The replaceable LED street lamp module according to claim 1, wherein a support plate is arranged between the flat face of the heat pipe set and the inner radiator, and the back face of the support plate fits an end of the inner radiator.

3. The replaceable LED street lamp module according to claim 1, wherein a plurality of first grooves are arranged on the outer wall of the outer cylinder of the inner radiator in the axial direction, the U-shaped ends of the heat pipes are matched and attached in the first grooves, wherein the first grooves are arc-shaped, the U-shaped ends each comprise an arc-shaped face, the arc-shaped faces are fitted into the first grooves.

4. The replaceable LED street lamp module according to claim 1, wherein a plurality of second grooves are arranged on a wall face of the through hole of the outer radiator in the axial direction, the U-shaped ends of the heat pipes are matched and attached in the second grooves, wherein the second grooves are arc-shaped, the U-shaped ends each comprise an arc-shaped face, the arc-shaped faces are fitted into the second grooves.

5. The replaceable LED street lamp module according to claim 3, wherein the fins are arranged on the inner radiator as close as possible to the first grooves.

6. The replaceable LED street lamp module according to claim 4, wherein the radiating fins are arranged on the outer radiator as close as possible to the second grooves.

7. The replaceable LED street lamp module according to claim 1, wherein outer sides of the radiating fins of the outer radiator are in turn connected by a connecting fin to form a plurality of outer airflow channels that can produce a chimney effect by the received heat energy.

8. The replaceable LED street lamp module according to claim 1, wherein the lens is fixed on one of the support plate, the inner radiator, and the outer radiator.

9. The replaceable LED street lamp module according to claim 1, wherein mounting holes are arranged at the outer edges of the clamping sheets.

* * * * *